United States Patent
Garces et al.

(10) Patent No.: US 9,343,897 B2
(45) Date of Patent: May 17, 2016

(54) CIRCUIT BREAKER SYSTEM AND METHOD

(71) Applicant: General Electric Company, Schenectady, NY (US)

(72) Inventors: Luis Jose Garces, Niskayuna, NY (US); Rui Zhou, Niskayuna, NY (US); Ravisekhar Nadimpalli Raju, Niskayuna, NY (US); Satish Prabhakaran, Niskayuna, NY (US); Philip Michael Cioffi, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 104 days.

(21) Appl. No.: 14/454,836

(22) Filed: Aug. 8, 2014

(65) Prior Publication Data

US 2016/0006238 A1    Jan. 7, 2016

Related U.S. Application Data

(60) Provisional application No. 62/021,417, filed on Jul. 7, 2014.

(51) Int. Cl.
*H02H 3/00* (2006.01)
*H02H 9/02* (2006.01)
(Continued)

(52) U.S. Cl.
CPC .............. *H02H 9/02* (2013.01); *H01H 71/1045* (2013.01); *H02H 3/087* (2013.01); *H01H 9/42* (2013.01); *H01H 9/542* (2013.01)

(58) Field of Classification Search
USPC ...................................... 361/8–12, 93.7–93.9
See application file for complete search history.

(56) References Cited

U.S. PATENT DOCUMENTS 5,737,162 A * 4/1998 Ito .......................... H01H 33/596
                                                                    361/13
6,952,335 B2    10/2005 Huang et al.
(Continued)

FOREIGN PATENT DOCUMENTS

CN      103280763 A     9/2013
CN      203376450 U     1/2014
(Continued)

OTHER PUBLICATIONS

Juvekar S. et al., "A fast acting DC solid state fault isolation device (FID) with Si and SiC devices for MVDC distribution system", Energy Conversion Congress and Exposition (ECCE), 2012 IEEE, Sep. 15-20, 2012, pp. 2005-2010; Conference Location: Raleigh, NC.

(Continued)

*Primary Examiner* — Danny Nguyen
(74) *Attorney, Agent, or Firm* — Andrew J. Caruso

(57) ABSTRACT

A circuit breaker device includes plural bridges conductively coupled parallel to each other between plural terminals that are configured to be conductively coupled with a power source and a load. The bridges include first and second outer bridges each having plural switches and at least an impedance bridge. The switches of the first and second outer bridges are configured to be closed to conduct electric current between the power source and the load and at least one switch in each of the first and second outer bridges are configured to be opened while at least one other switch in each of the first and second outer bridges are configured to remain closed to prevent conduction of the electric current between the power source and the load and to direct the electric current into the impedance bridge.

20 Claims, 9 Drawing Sheets

(51) Int. Cl.
*H01H 71/10* (2006.01)
*H02H 3/087* (2006.01)
*H01H 9/54* (2006.01)
*H01H 9/42* (2006.01)

(56) References Cited

U.S. PATENT DOCUMENTS

| | | |
|---|---|---|
| 7,212,036 B2 | 5/2007 | Kasuya et al. |
| 7,768,758 B2 | 8/2010 | Maier et al. |
| 8,644,037 B2 | 2/2014 | Raju et al. |
| 2009/0244939 A1 | 10/2009 | Fornage |
| 2013/0221941 A1 | 8/2013 | Rozman et al. |
| 2014/0029152 A1 | 1/2014 | Mazzola et al. |
| 2014/0346891 A1* | 11/2014 | Kang .................. H03K 17/122 307/113 |

FOREIGN PATENT DOCUMENTS

| | | |
|---|---|---|
| EP | 1089423 A2 | 4/2001 |
| EP | 2523334 A1 | 11/2012 |
| WO | 2011057675 A1 | 5/2011 |
| WO | 2012100831 A1 | 8/2012 |
| WO | 2014117613 A1 | 8/2014 |
| WO | 2014117614 A1 | 8/2014 |
| WO | 2014131298 A1 | 9/2014 |

OTHER PUBLICATIONS

Wang et al., "Design and performance evaluation of overcurrent protection schemes for silicon carbide (SiC) power MOSFETs", Energy Conversion Congress and Exposition (ECCE), 2013 IEEE, Sep. 15-19, 2013, pp. 5418-5425; Conference Location: Denver, CO.
PCT Search Report and Written Opinion issued in connection with corresponding Application No. PCT/US2015/039347 on Oct. 8, 2015.

* cited by examiner

CIRCUIT BREAKER SYSTEM AND METHOD

CROSS-REFERENCE TO RELATED APPLICATIONS

This application claims priority to U.S. Provisional Application No. 62/021,417, which was filed on 7 Jul. 2014, and the entire disclosure of which is incorporated herein by reference.

FIELD

Embodiments of the subject matter described herein relate to switches that control conduction of electric current to one or more loads, and protect the system under fault conditions.

BACKGROUND

Various electric systems include switches that control conduction of electric current to one or more loads. For example, in oil or gas mining operations, submersible pumps may be disposed in a well to remote oil or gas from the well. These pumps may be powered by relatively large amounts of current.

In order to control conduction of the current to the pumps, switches may be used. The choice of switches may be limited, however, due to the confined space and harsh environment in which the switches are located. Known switches that are sufficiently small to fit in the wells may not be capable of stopping conduction of the large current supplied to the pumps. Switches that are larger and able to stop conduction of this current may be too large to fit in the well and/or unable to withstand the harsh environment in the well.

Another example is a medium voltage direct current (MVDC) ship distribution system. In such a system, fast solid state circuit breakers may be needed to reduce the let through energy during the fault (e.g., electric energy that passes through the breaker line to line, line to ground short, or the like).

BRIEF DESCRIPTION

In one embodiment, a circuit breaker device includes plural bridges conductively coupled parallel to each other between plural terminals that are configured to be conductively coupled with a power source and a load. The bridges include first and second outer bridges each having plural switches and at least an impedance bridge. The switches of the first and second outer bridges are configured to be closed to conduct electric current between the power source and the load and at least one switch in each of the first and second outer bridges are configured to be opened while at least one other switch in each of the first and second outer bridges are configured to remain closed to prevent conduction of the electric current between the power source and the load and to direct the electric current into the impedance bridge.

In another embodiment, a circuit breaker assembly includes plural circuit breaker devices conductively coupled in series with each other between opposite terminal ends that are configured to be conductively coupled with a power source and a load between the power source and the load. The circuit breaker devices include plural bridges conductively coupled parallel to each other between the power source and the load. The bridges of each of the circuit breaker devices include first and second outer bridges each having plural switches and at least an impedance bridge. The switches of the first and second outer bridges in each of the circuit breaker devices are configured to be closed to conduct electric current through the respective circuit breaker device between the power source and the load. At least one switch in each of the first and second outer bridges of each of the circuit breaker devices is configured to be opened while at least one other switch in each of the first and second outer bridges of the respective circuit breaker device are configured to remain closed to prevent conduction of the electric current between the power source and the load and to direct the electric current into the impedance bridge of the respective circuit breaker device.

In another embodiment, a circuit breaker system includes plural circuit breaker assemblies conductively coupled in parallel to each other between opposite first terminal ends. Each of the circuit breaker assemblies includes plural circuit breaker devices conductively coupled in series with each other between opposite second terminal ends that are configured to be conductively coupled with a power source and a load between the power source and the load. The circuit breaker devices include plural bridges conductively coupled parallel to each other between the power source and the load. The bridges of each of the circuit breaker devices include first and second outer bridges each having plural switches and at least an impedance bridge. The switches of the first and second outer bridges in each of the circuit breaker devices are configured to be closed to conduct electric current through the respective circuit breaker device between the power source and the load. At least one switch in each of the first and second outer bridges of each of the circuit breaker devices is configured to be opened while at least one other switch in each of the first and second outer bridges of the respective circuit breaker device are configured to remain closed to prevent conduction of the electric current between the power source and the load and to direct the electric current into the impedance bridge of the respective circuit breaker device.

BRIEF DESCRIPTION OF THE DRAWINGS

The subject matter described herein will be better understood from reading the following description of non-limiting embodiments, with reference to the attached drawings, wherein below.

DETAILED DESCRIPTION

One or more embodiments of the inventive subject matter described herein relate circuit breaker assemblies and methods that can be used to protect electric loads and/or power sources used to power the loads. Some medium voltage direct current (DC) distribution system may need protection devices such as DC circuit breakers. Some known mechanical type DC circuit breakers have relatively slow response times (e.g., at least a couple of milliseconds). One or more aspects described herein provides for a series and/or parallel connection of silicon carbide metal-oxide-semiconductor field effect transistor (MOSFET) devices (or other types of devices) to perform DC current interruption functions of a circuit breaker. These types of circuit breakers can be referred to as solid state circuit breakers (SSCB). The circuit breaker assemblies described herein can have much faster response times, such as from 250 to 500 microseconds, or a faster or slower response time. These assemblies can be formed from switches that are connected in parallel bridges with each other to allow the assemblies to control conduction of current that is of a much larger magnitude than could otherwise be controlled by a lesser number or other arrangement of the switches.

Additionally, the circuit breaker assemblies may have smaller sizes than some known circuit breaker assemblies, and/or may reduce losses otherwise caused by using other types of circuit breakers. For example, the circuit breaker assemblies described herein may include parallel and/or series connected breaker devices that can reduce the overall losses of the assemblies relative to other types of circuit breaker assemblies. In one aspect, the conduction efficiency (e.g., the amount of electric current that is conducted through the assembly) may be at least 99.8% or another percentage.

Figure 1:
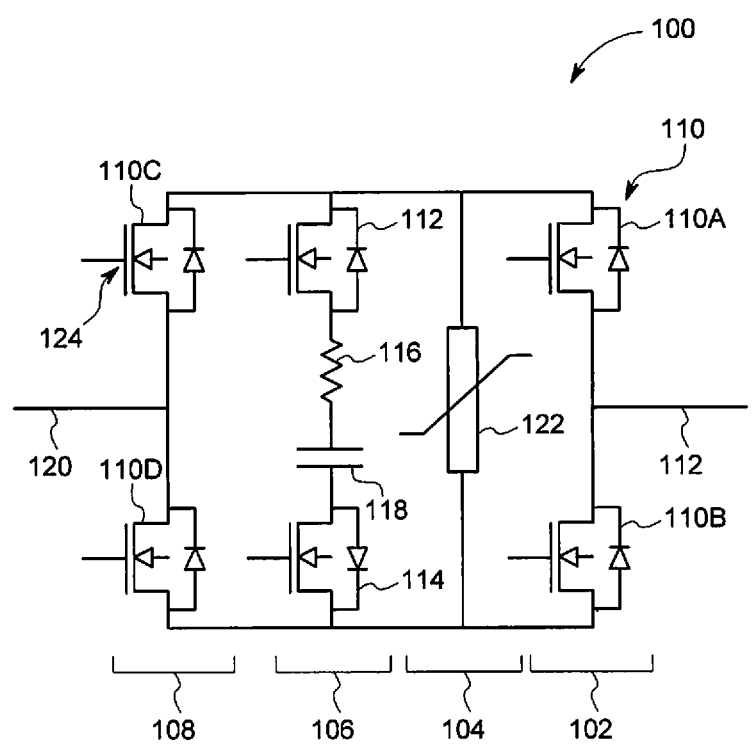
FIG. 1 is a circuit diagram of a circuit breaker device according to one embodiment.

FIG. 1 is a circuit diagram of a circuit breaker device 100 according to one embodiment. The device 100 includes several bridges 102, 104, 106, 108 that are conductively coupled with each other in parallel between a conductive input terminal 120 and a conductive output terminal 112. Electric current (e.g., DC) can be conducted from the input terminal 120, through the device 100, and to one or more loads or other devices 100 via the output terminal 112. Optionally, current can be conducted from the one or more loads or other devices 100 into the device 100 shown in FIG. 1 via the output terminal 112, through the device 100, and out of the device 100 via the input terminal 120.

The bridges 102, 104, 106, 108 are connected in parallel to each other with conductors 114, 116. The bridges 102, 108 on the opposite outer sides of the device 100 can be referred to as switching bridges 102, 108. These bridges 102, 108 include switches 110 (e.g., switches 110A-D) that are closed or turned on to conduct electric current through the switches 110, and can be opened or turned off to block the conduction of electric current through the switches 110. In one example, the switches 110 can include silicon carbide MOSFET devices 124 (or another type of semiconductor switch). The switches 110 can be connected with a drive device, such as a device including hardware circuits or circuitry that include and/or are connected with one or more processors (e.g., one or more computer processors), for controlling when the switches 110 are closed or opened.

The bridge 106 is located between the bridges 102, 108 and can be referred to as an impedance network or an impedance bridge. The bridge 106 includes components that can match the impedance of a power delivery system that connects the device 100 with one or more power sources (e.g., alternators, generators, or the like), one or more loads (e.g., machines or the like), and/or one or more other devices 100. For example, the impedance value of the bridge 106 can be the same as or within a designated threshold (e.g., within 0.5%, within 1%, within 5%, or within another value) of, the impedance value of the cables, wires, or other components to which the device 100 is connected.

In the illustrated embodiment, the bridge 106 includes switches 112, 114 with one or more resistive elements 116 and one or more capacitive elements 118 conductively coupled with each other and disposed between the switches 112, 114. The switches 112, 114 may be similar or identical to the switches 110, or may include different types of switches. The resistive element 116 reduces the flow of current through the bridge 106, such as one or more resistors. The capacitive element 118 electrostatically stores electric energy of the current being conducted through the bridge 106. In combination, the resistive element 116 and the capacitive element 118 can form one or more resistor-capacitor (RC) circuits.

The bridge 104 is located between the bridges 102, 108 and can be referred to as an arrester bridge. The bridge 104 includes one or more components that can absorb electric energy being conducted in the device 100. For example, the bridge 104 can include an arrester device 122, such as one or more thermistors, resistive elements, or the like.

The device 100 shown in FIG. 1 can operate as a bi-directional circuit breaker. In one aspect, the switches 110, 112, 114 may be 2.2 kilovolt (kV) silicon carbide MOSFET switches. Optionally, another type of switch may be used. The device 100 may be a 1 kV unipolar bi-directional circuit breaker.

Figure 2:
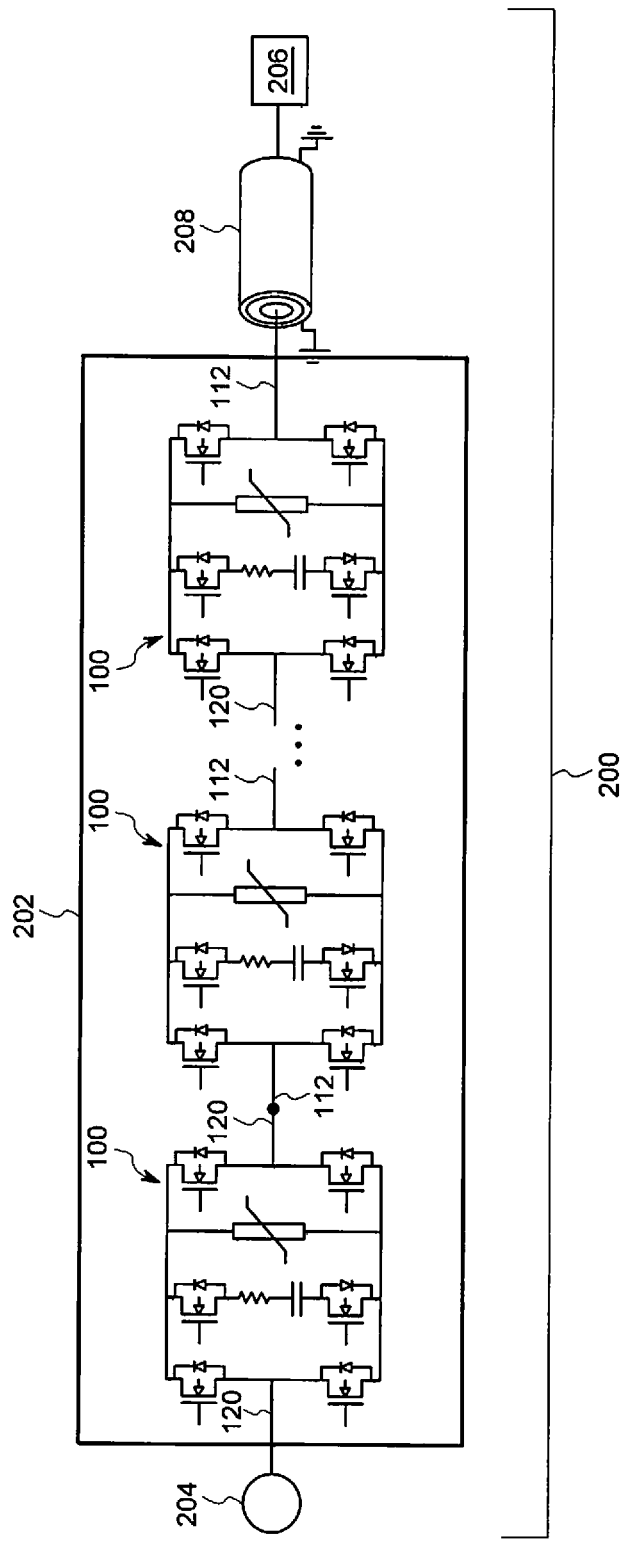
FIG. 2 schematically illustrates a power delivery system according to one embodiment.

FIG. 2 schematically illustrates a power delivery system 200 according to one embodiment. The system 200 includes a circuit breaker assembly 202 that includes plural devices 100 connected with each other. In the illustrated example, the devices 100 are connected in series with each other in the assembly 202. For example, the input terminals 120 of one or more (but not all) of the devices 100 can be connected with the output terminals 112 of one or more (but not all) of the devices 100. Alternatively, two or more of the devices 100 can be connected in parallel with each other in the assembly 202.

The assembly 202 is conductively coupled with and disposed between one or more power sources 204 and one or more loads 206. The power source 204 can include one or more alternators, generators, batteries, or the like, that supply electric current (e.g., DC) to the loads 206 via the assembly 202. In the illustrated example, the power source 204 supplies at least 20 kV of DC to the loads 206 via the assembly 202. The assembly 202 conducts the current to the loads 206 via one or more cables 208. The power source 204 and/or the loads 206 can detect short circuit events or other faults with the power source 204 and/or loads 206. Responsive to such a short circuit or other fault, the assembly 202 can operate to quickly stop conduction of the current between the power source 204 and loads 206.

Figure 3:
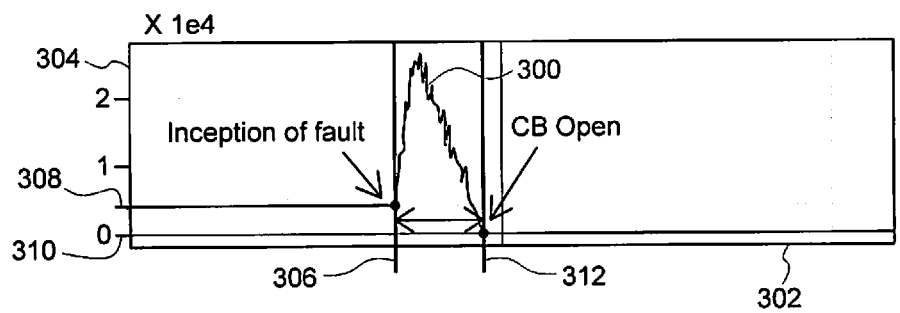
FIG. 3 illustrates electric current conducted through a circuit breaker assembly shown in FIG. 2 according to one example of operation.

With continued reference to the device 100 shown in FIG. 1 and the assembly 202 shown in FIG. 2, FIG. 3 illustrates electric current 300 conducted through the assembly 202 shown in FIG. 2 according to one example of operation of the assembly 202. The current 300 is shown alongside a horizontal axis 302 representative of time and a vertical axis 304 representative of the magnitude of the current 300. Prior to inception of a fault (e.g., a short circuit), the current 300 is conducted through the assembly 202 at a designated level 308, such as at 300 amps or another value. At a fault time 306, the current 300 may begin rapidly increasing due to the fault (e.g., short circuit) in the power source 204, loads 206, or other location in the system 200 shown in FIG. 2.

Responsive to detection of the fault at the fault time 306, the devices 100 in the assembly 202 may be controlled to stop conduction of the current between the power source 204 and the loads 206. In one embodiment, once the fault is detected (e.g., by an increase in the current above a threshold or at a rate that is faster than a designated rate or a drop on voltage), the switches 112, 114 in the bridge 106 forming the impedance network can be closed. Additionally, some, but not all, of the switches 110 in the outer bridges 102, 108 may be opened while other switches 110 in these bridges 102, 108 remain closed.

In one embodiment, one of the switches 110 in each of the bridges 102, 108 may be opened while the other switch 110 in the same bridge 102, 108 remains closed responsive to the fault occurring. Which of the switches 110 that open and the switches 110 that remain closed may depend on the direction in which the fault current is being conducted through the device 100. If the fault current is being conducted into the device 100 via the input terminal 120 and out of the device 100 via the output terminal 112, then the switch 110D in the bridge 108 may open while the other switch 110C in the bridge 108 remains closed, and the switch 110A in the bridge 102 may open while the other switch 110B in the bridge 102 remains closed. For example, if the current is being conducted from the input terminal 120 to the output terminal 112, the switch 110D that is between the input terminal 120 and the bridges 102, 104, and/or 106 may be opened and the switch 110A that is between the bridges 104, 106, and/or 108 and the output terminal 112 may be opened. On the other hand, if the current is being conducted into the device 100 via the output terminal 112 and out of the device 110 via the input terminal 120, then the switch 110C in the bridge 108 and the switch 110B in the bridge 102 may be opened while the other switches 110D, 110A in the bridges 108, 102 may remain closed. For example, the switch 110C in the bridge 108 that is between the input terminal 120 and the bridges 102, 104, 106 may be opened and the switch 110B in the bridge 102 that is between the output terminal 112 and the bridges 104, 106, 108 may be opened. Alternatively, another combination of the switches 110 may open or close.

Opening this combination of switches 110 can direct the current being conducted through the device 100 to be conducted into the impedance network of the bridge 106 instead of through the bridges 102, 108. The current that was being conducted through the closed switches 110A-D between the terminals 112, 120 and not through the opened switches 112, 114 of the bridge 106 can then be conducted into the impedance network of the bridge 106 via the closed switches 112, 114 in the bridge 106. The RC circuit formed by the resistive element 116 and the capacitive element 118 can then begin to reduce voltage across the device 100.

Figure 4:
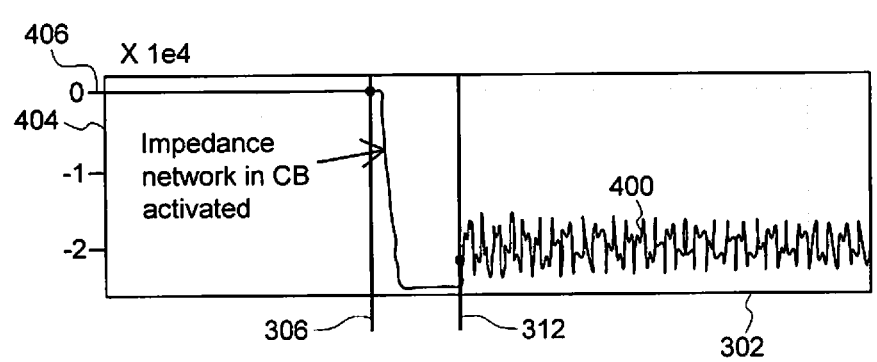
FIG. 4 illustrates voltage across the circuit breaker assembly shown in FIG. 2 according to one example.

FIG. 4 illustrates voltage 400 across the assembly 202 shown in FIG. 2 according to the example of operation of the assembly 202 shown in FIG. 3. The voltage 400 is shown alongside the horizontal axis 302 representative of the same time as in the axis 302 of FIG. 3 and a vertical axis 404 representative of the magnitude of the voltage across the device 100. Prior to the closing of the switches 112, 114 of the impedance network and the opening of switches 110 in the outer bridges 102, 108, the voltage 400 may be at a first level 406, such as zero or another value.

Responsive to the combination of the switches 110 in the outer bridges 102, 108 being opened and the switches 112, 114 in the bridge 106 being closed at or subsequent to the fault time 306, the voltage 400 across the device 100 begins to decrease at a rapid rate. In the illustrated example, the voltage 400 decreases to a value of $-2.5 \times 10^4$ volts, but alternatively may change to another value. As this voltage 400 decreases, the current 300 conducted through the device 100 is increasing, as shown in FIG. 3. The current 300 then decreases due to the current 300 resonating between the resistive element 116 and/or the capacitive element 118 in the impedance network of the bridge 106, while the voltage 400 is clamped by arrestor 122. This resonance can cause the current 300 to rapidly decrease after reaching the peak.

Returning to the description of the current 300 conducted through the device 100 shown in FIG. 3, the current 300 may continue to decrease due to the current 300 being conducted to the impedance network. In one embodiment, once the current 300 decreases to no more than a designated threshold, the switches 112, 114 can be opened to prevent conduction of current into the impedance network of the bridge 106. This current may then be conducted to the arrester device 122. The arrestor device 122 can absorb the remaining current 300 so that the current 300 continues to decrease and/or is eliminated (e.g., decreases to zero).

Responsive to the current 300 decreasing to at least a designated current threshold 310 at an opening time 312, the remaining switches 110 in the outer bridges 102, 108 can be opened. For example, when the current 300 decreases to zero or approximately zero (e.g., decreases to no greater than 10 amps, 1 amp, or the like), the device 100 can be opened at the opening time 312 to prevent further conduction of the current 300 through the device 100.

Figure 5:
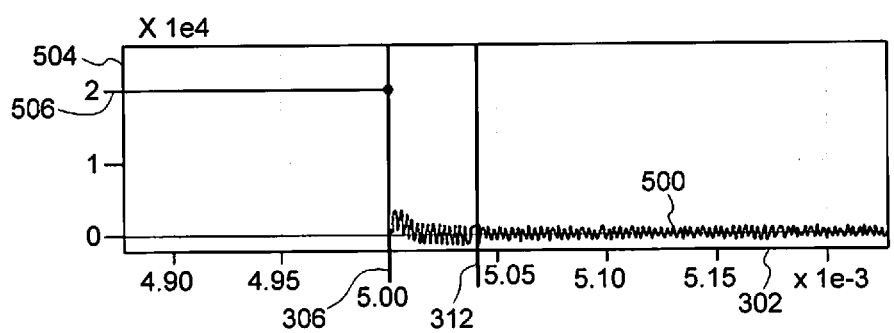
FIG. 5 illustrates voltage supplied to loads shown in FIG. 2 according to one example.

FIG. 5 illustrates voltage 500 supplied to the loads 206 shown in FIG. 2 according to the example of operation of the assembly 202 shown in FIGS. 3 and 4. The voltage 500 (also referred to as a load voltage) is shown alongside the horizontal axis 302 representative of the same time as in the axis 302 of FIGS. 3 and 4. The load voltage 500 also is shown alongside a vertical axis 504 representative of the magnitude of the load voltage 500. Prior to the closing of the switches 112, 114 of the impedance network and the opening of switches 110 in the outer bridges 102, 108, the load voltage 500 may be at a first level 506, such as $2 \times 10^4$ volts or another value. Responsive to the occurrence of the fault at the fault time 306, the load voltage 500 may rapidly decrease, as shown in FIG. 5. The load voltage 500 may oscillate but remain relatively low.

Following the opening time 312, the current 300 that was being conducted through the device 100 remains at or near zero. Both the voltage 400 across the device 100 and the load voltage 500 may oscillate at relatively low values, as shown in FIGS. 4 and 5. As a result, the power source 204 and/or the load 206 are protected from the short circuit current (e.g., the current 300) following the fault time 306. In one embodiment, the device 100 can safely decrease this current 300 as described above within a relatively short time period due to the use of solid state switches 110. For example, the time period between the fault time 306 and the opening time 312 may be 50 microseconds or less, or another time period. Consequently, the device 100 can quickly and safely interrupt conduction of the current between the power source 204 and the load 206.

Several of the devices 100 in the assembly 200 can be operated in this manner in order to safely stop the conduction of current between the power source 204 and the load 206. The use of several devices 100 can allow for the assembly 200 to quickly stop conduction of large magnitudes of current. For example, the switches 110, 112, 114 may be solid state switches (e.g., silicon carbide MOSFET switches) that are individually capable of stopping conduction of relatively low amounts of current. In one embodiment, the switches 110, 112, 114 may be 2.2 kV switches 110, 112, 114, but, when used in the manner described above, the switches 110, 112, 114 in the devices 100 may be capable of stopping conduction of much larger voltages, such as 20 kV or more.

Figure 6:
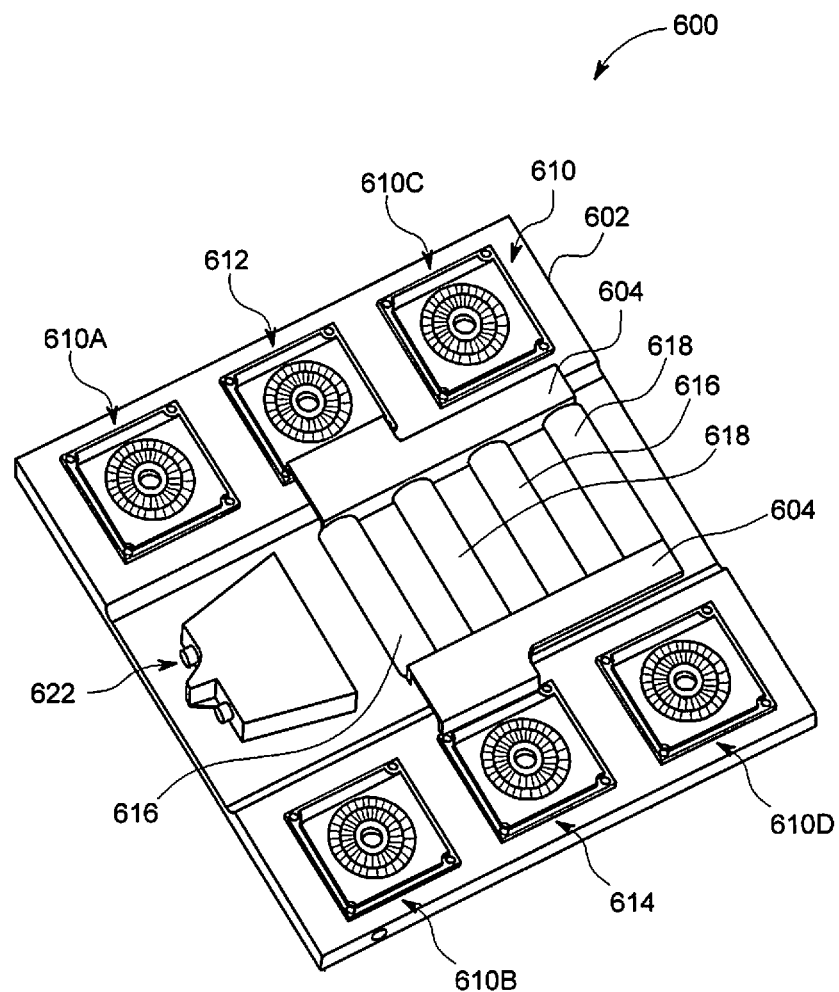
FIG. 6 illustrates a perspective view of a circuit breaker device according to one embodiment.

FIG. 6 illustrates a perspective view of a circuit breaker device 600 according to one embodiment. The device 600 may represent the circuit breaker device 100 shown in FIG. 1. The device 600 includes a supporting body 602, such as a dielectric substrate, on which conductive components of the device 600 may be disposed. Several switches 610, 612, 614 are connected with the supporting body 602. The switches 610 include the switches 610A-D, and can represent the corresponding switches 110A-D shown in FIG. 1. The switch 612 can represent the switch 112 shown in FIG. 1, and the switch 614 can represent the switch 114 shown in FIG. 1.

The switches 610A and 610B can be conductively coupled with each other and the switches 610C and 610D can be conductively coupled with each other by one or more buses, wires, or the like, inside or on the supporting body 602. The switches 610A, 612, 610C can be conductively coupled with each other and the switches 610B, 614, 610D can be conductively coupled with each other by one or more buses, wires, or the like, inside or on the supporting body 602. The device 600 also includes an arrester device 622 that may represent the arrester device 122 shown in FIG. 1. The arrester device 622 can be conductively coupled with the switches 610, 612, 614 similar or identical to the manner in which the arrester device 122 is connected with the switches 110, 112, 114 shown in FIG. 1 by one or more conductive wires, buses, or the like, inside or on the supporting body 602.

The device 600 includes plural resistive bodies 616 and/or capacitive bodies 618 that conductively couple the switches 612, 614 with each other. In the illustrated embodiment, the resistive bodies 616 and capacitive bodies 618 are connected with the switches 612, 614 in parallel with each other. For example, conductive terminal ends 604 may conductively couple the switches 612, 614 with the resistive bodies 616 and capacitive bodies 618.

Figure 7:
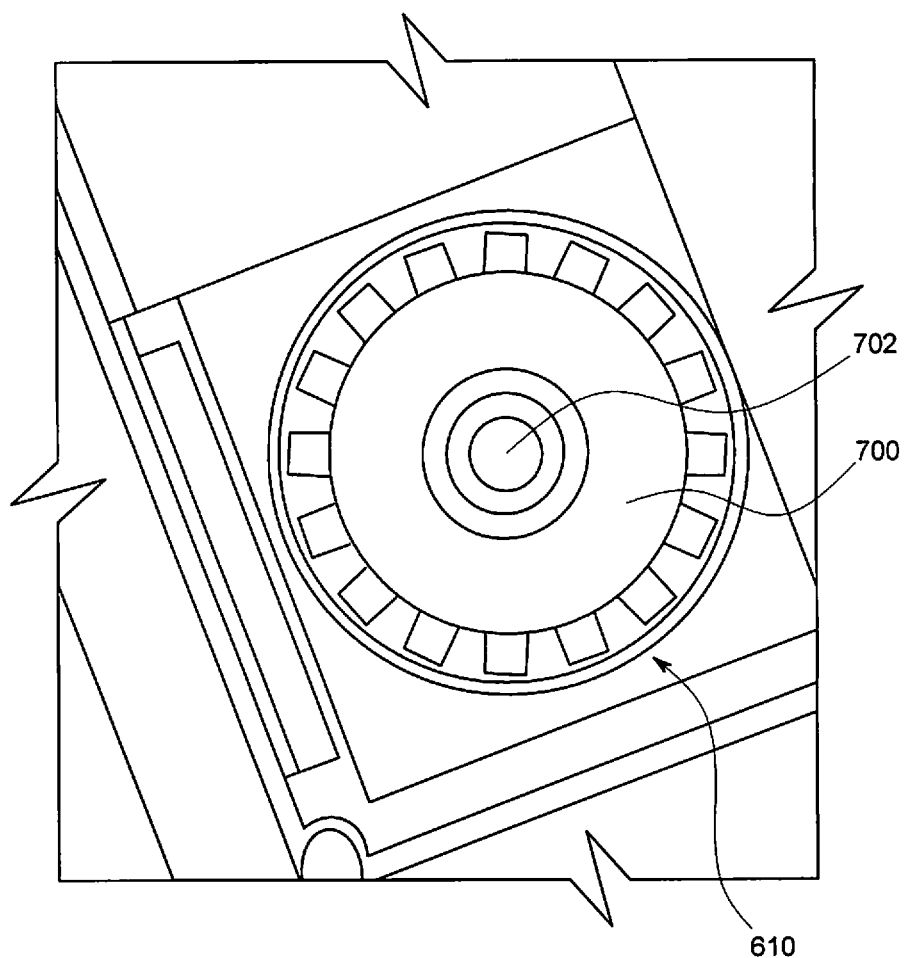
FIG. 7 is a perspective view of a switch shown in FIG. 6 according to one embodiment.

FIG. 7 is a perspective view of one of the switches 610 shown in FIG. 6 according to one embodiment. The switches 610 include a ring shaped body 700 that may have a circular or non-circular shape. The ring shaped body 700 extends around and defines a gate opening 702. This opening 702 may extend through the entire switch 610. A portion of the ring shaped body 700 that abuts the gate opening 702 may be the gate terminal of the switch 610 or may be conductively coupled with the gate terminal.

The gate terminal of the switch 610 can be conductively coupled with a drive device, such as a gate driver or gate drive unit, that conducts electric current to the gate terminal. For example, a wire or cable may be inserted into the gate opening 702 such that the wire or cable is conductively coupled with the gate terminal of the switch 610. Several different switches 610 may be aligned with each other such that the gate openings 702 are axially aligned with each other along a gate axis. The conductive wire or cable may extend through several gate openings 702 of several switches 610 along this gate axis such that the wire or cable is conductively coupled with the gate terminals of the switches 610. The drive device may then simultaneously or near simultaneously activate the switches 610 by conducting a current along the wire or cable to activate the switches 610 at the same time.

The switch 610 can be formed from multiple semiconductor device dies (e.g., semiconductor switches) conductively coupled in parallel with each other to have at least a rated current capability of the switch 610. In one embodiment, the switch 610 can include 22 dies in parallel. Alternatively, the switch 610 may have a larger or lesser number of dies, or a single die.

Figure 8:
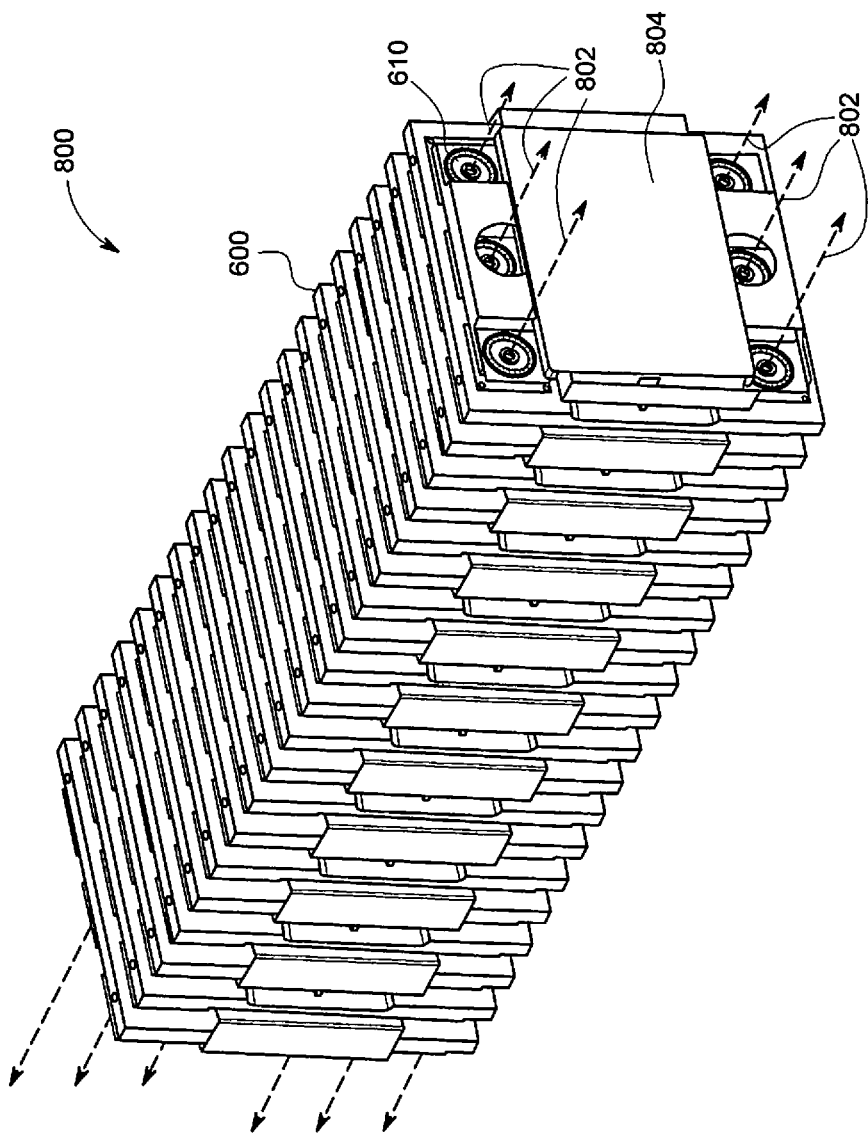
FIG. 8 is a perspective view of a circuit breaker assembly according to one embodiment.

FIG. 8 is a perspective view of a circuit breaker assembly 800 according to one embodiment. The circuit breaker assembly 800 can represent one embodiment of the circuit breaker assembly 202 shown in FIG. 2. The assembly 800 includes several of the circuit breaker devices 600 stacked next to each other. The devices 600 may be planar or substantially planar devices in that the outer dimensions of the devices 600 are larger in to orthogonal directions in a common plane than the outer dimensions of the devices 600 in another orthogonal direction that is perpendicular to this plane.

The devices 600 may be aligned with each other so that the switches 610 in the devices 600 are axially aligned with each other. As described above, the gate openings 702 of the devices 600 in the assembly 800 may be co-axial with each other such that a gate axis 802 linearly extends through the gate openings 702 of the switches 610 that are axially aligned with each other. In the illustrated example, six sets of switches 610 are axially aligned along six different gate axes 802. One gate axis 802 may extend through the gate openings 702 of the switches 610A of the devices 600 in the assembly 800, another gate axis 802 may extend through the gate openings 702 of the switches 610B of the devices 600 in the assembly 800, another gate axis 802 may extend through the gate openings 702 of the switches 610C of the devices 600 in the assembly 800, and so on.

One or more wires or cables may extend along a gate axis 802 in order to be conductively coupled with the gate terminals of the switches 610 that are aligned along the gate axis 802. For example, a first wire may extend along one gate axis 802 to be conductively or electromagnetically coupled with the gate terminals of the switches 610A of the devices 600 in the assembly 800, a second wire may extend along another gate axis 802 to be conductively or electromagnetically coupled with the gate terminals of the switches 610B of the devices 600 in the assembly 800, a third wire may extend along another gate axis 802 to be conductively or electromagnetically coupled with the gate terminals of the switches 610C of the devices 600 in the assembly 800, and so on. A gate driver can direct current to be conducted down a wire to activate the switches 610 that are axially aligned and coupled with the wire at the same time (or within a time period that includes delays for propagation of the current along the wire). By doing so, the gate driver can activate the same switches 610 in the different devices 600 at the same time or nearly the same time. A conductive interconnect body 804 is conductively coupled with the switches 610 in the devices 600 of the assembly 800. The interconnect body 804 winds back-and-forth between the devices 600 to conductively couple the devices 600 in series.

Figure 9:
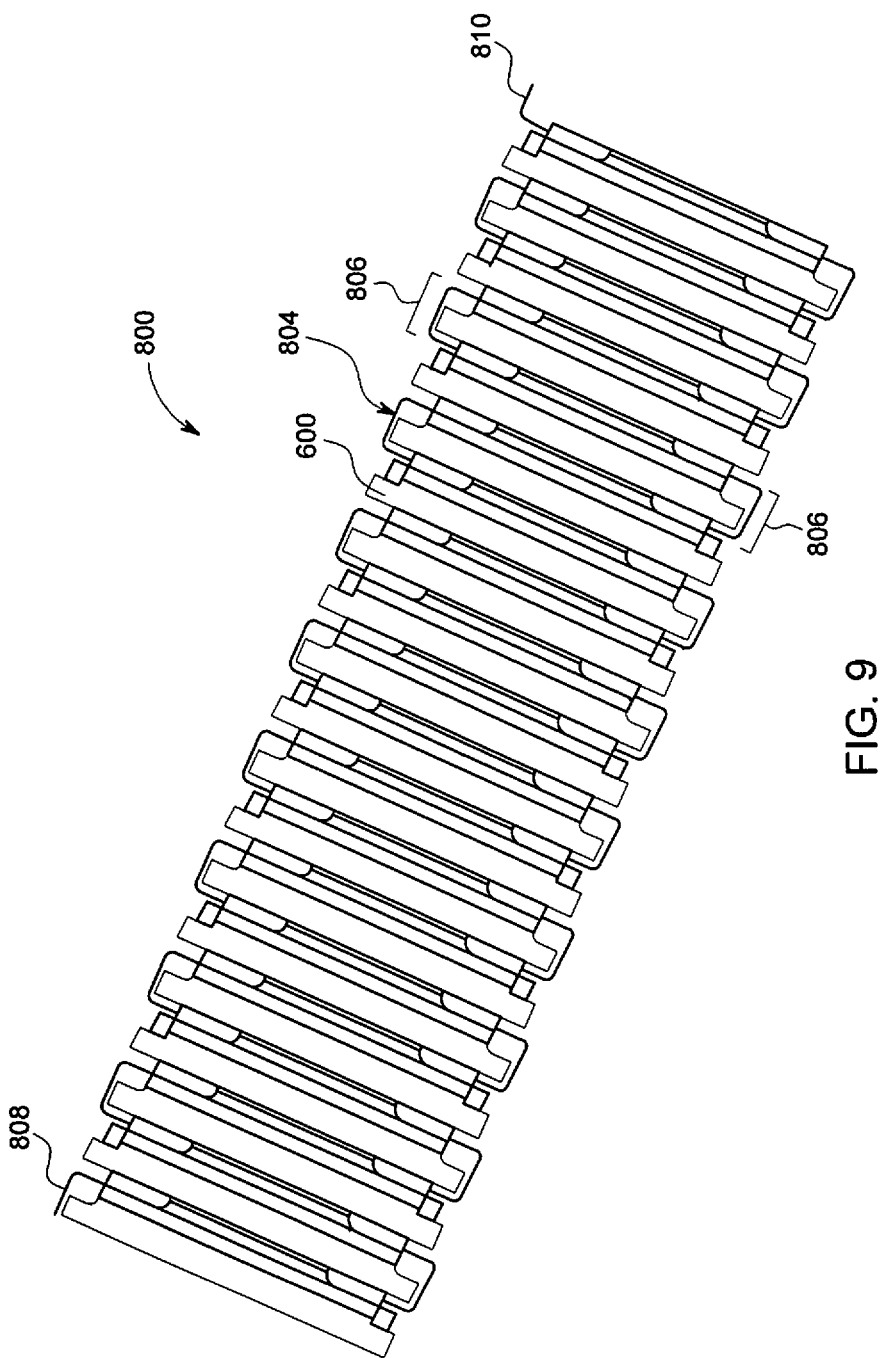
FIG. 9 illustrates a side view of the circuit breaker assembly shown in FIG. 8.

With continued reference to the assembly 800 shown in FIG. 8, FIG. 9 illustrates a side view of the assembly 800 shown in FIG. 8. As described above and shown in FIG. 9, the devices 600 in the assembly 800 are stacked side-by-side with each other. The interconnect body 804 is formed from one or more conductive materials and wraps back-and-forth between the devices 600 that neighbor each other. The interconnect body 804 can be conductively coupled with the switches 610 (shown in FIG. 8) on one side of the body 602 of a first device 600. The interconnect body 804 may include a bend or turn 806 that causes another portion of the body 804 to pass along the opposite side of the body 602 of the first device 600. This portion of the body 804 is between the body 602 of the first device 600 and a body 602 of a neighboring, second device 600. This portion of the body 804 also may be conductively coupled with the switches 610 of second device 600. The interconnect body 804 may include another bend or turn that causes another portion of the interconnect body 804 to be disposed between the second device 600 and a neighboring, third device 600. The interconnect body 804 may continue to wind back-and-forth between the devices 600 to cause the switches 610 of the devices 600 to be conductively coupled in series with each other.

The interconnect body 804 extends between opposite terminal ends 808, 810. The devices 600 are conductively coupled in series with each other between the ends 808, 810. Current may be conducted through the assembly 800 by receiving the current at one end 808 or 810, serially conducting the current through the devices 600 and the switches 610 as described above, and conducting the current to the other end 810 or 808. The end 808 or 810 may be conductively coupled with the power source 204 (shown in FIG. 2) while the other end 810 or 808 may be conductively coupled with the load 206 (shown in FIG. 2). The devices 600 may then operate as described above in connection with FIGS. 1 through 5 to prevent a short circuit event or fault from damaging the power source 204 and/or load 206.

Figure 10:
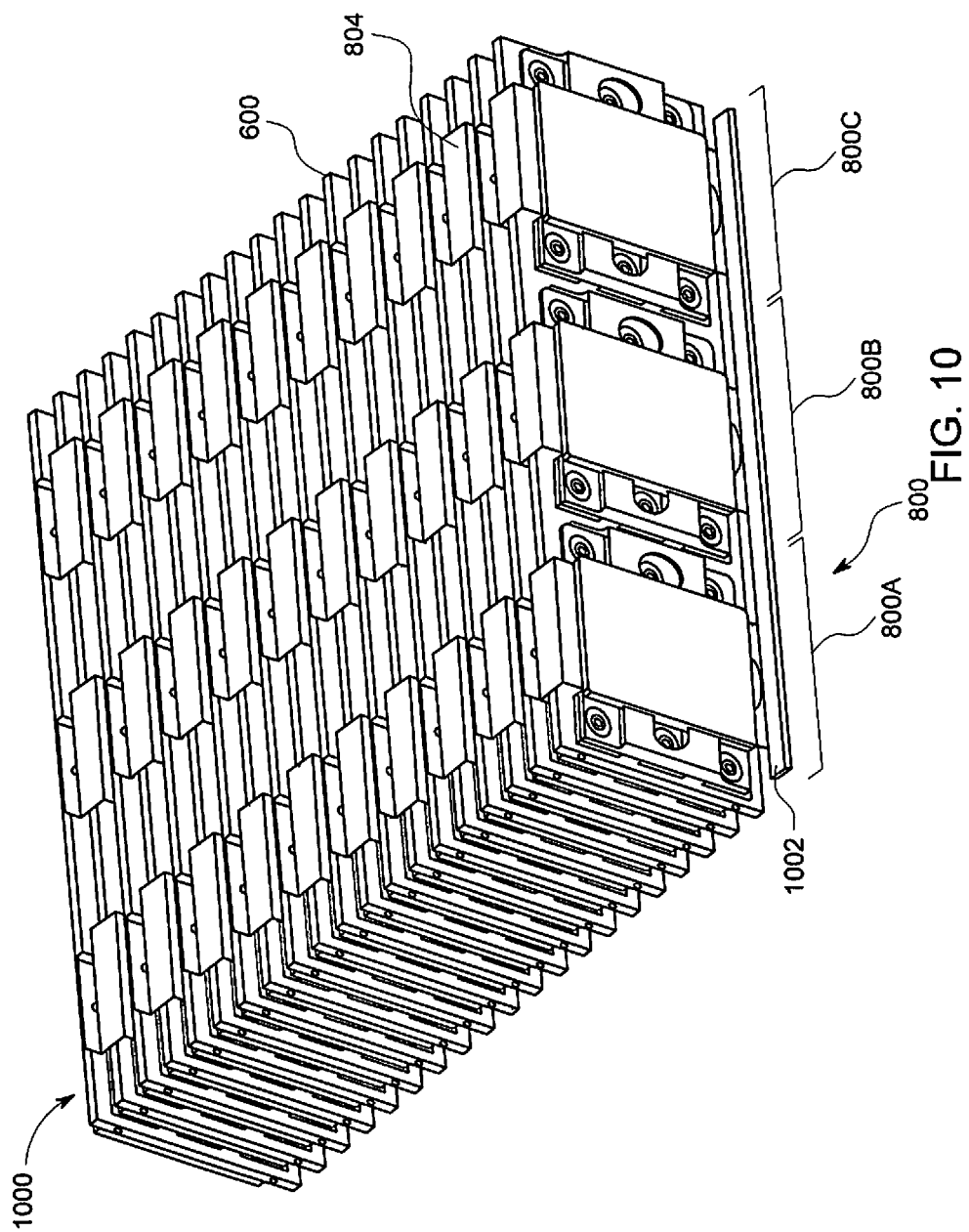
FIG. 10 is a perspective view of a circuit breaker system according to one embodiment.

FIG. 10 is a perspective view of a circuit breaker system 1000 according to another embodiment. The system 1000 includes several of the circuit breaker assemblies 800 (e.g., assemblies 800A-C) connected in parallel with each other. Each of the assemblies 800 includes a separate set of the devices 600 stacked side-by-side with a conductive interconnect body 804 conductively coupling the devices 600 in the assembly 800 in series with each other, as described above. While three assemblies 800 are included in the system 1000 shown in FIG. 10, alternatively, a smaller or larger number of the assemblies 800 may be included.

The ends 808 of the interconnect bodies 804 are conductively coupled with each other by a conductive terminal ends 1002. Similarly, the opposite ends 810 of the conductive pathway bodies 804 may be conductively coupled with each other by a similar, but separate conductive terminal end (not visible in FIG. 10, but may be similar or identical to the visible end 1002). Current may be conducted through the system 1000 by receiving the current at one terminal end, conducting the current along the parallel interconnect bodies 804 in the different assemblies 800, and conducting the current to the opposite terminal end. During conduction of the current along the parallel interconnect bodies 804, the current is serially conducted through the devices 600 and the switches 610 in each of the respective assemblies 800 as described above. One terminal end can be conductively coupled with the power source 204 (shown in FIG. 2) while the other terminal end can be conductively coupled with the load 206 (shown in FIG. 2). The assemblies 800 in the system 1000 may then operate as described above in connection with FIGS. 1 through 5 to prevent a short circuit event or fault from damaging the power source 204 and/or load 206.

Figure 11:
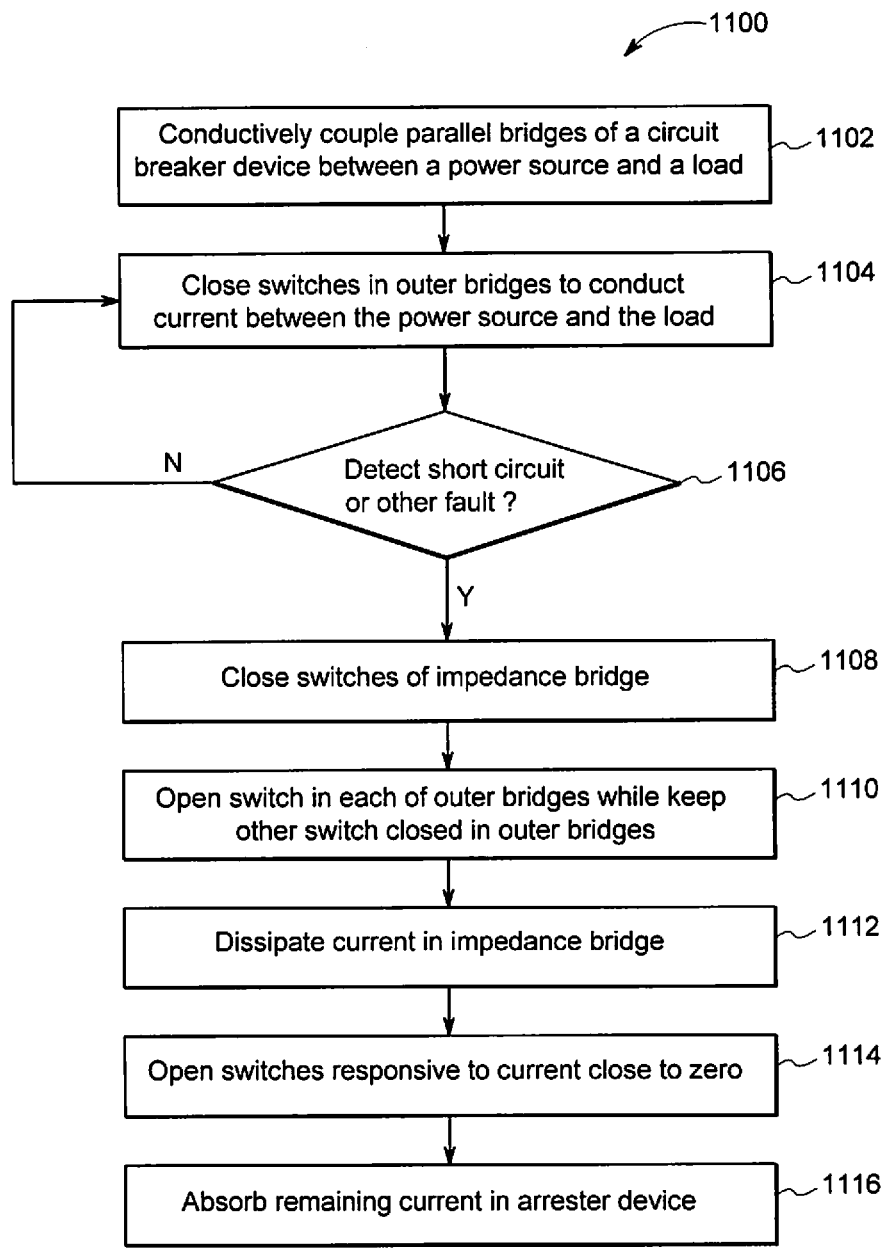
FIG. 11 is a flowchart of a circuit breaker method in accordance with one embodiment.

FIG. 11 is a flowchart of a circuit breaker method 1100 in accordance with one embodiment. The method 1100 may be practiced by one or more embodiments of the circuit breaker assemblies shown and described herein, or by another circuit breaker assembly. At 1102, several parallel bridges of a circuit breaker device are conductively coupled with each other and with at least one power source and at least one load. The bridges may be disposed in parallel to each other between the power source and the load. As described above, the outer bridges can include at least two switches and at least one internal bridge between the outer bridges can include an impedance network. Optionally, another internal bridge between the outer bridges can include an arrester device.

At 1104, the switches in the outer bridges of the circuit breaker device are closed in order to conduct electric current between the power source and the load. In the event that the circuit breaker assembly includes several circuit breaker devices, the switches in the outer bridges of the devices in the assembly may be closed at the same time or nearly the same time in order to conduct the current.

At 1106, a determination is made as to whether a short circuit or other fault is detected. For example, the current being conducted through the circuit breaker assembly, the voltage across the terminals of the circuit breaker assembly, or other electrical characteristics may be monitored. If this current, voltage, or other characteristic exceeds one or more thresholds representative of a short circuit or other fault event, then the circuit breaker assembly may need to safely and quickly stop conduction of current between the power source and the load in order to protect the power source and/or load. As a result, flow of the method 1100 can proceed to 1108. On the other hand, if no short circuit or other fault is detected, then flow of the method 1100 may return to 1104 so that current can continue to be conducted between the power source and the load. This current may be conducted through the circuit breaker assembly from the power source to the load, and/or from the load to the power source.

At 1108, responsive to detecting the short circuit or other fault, switches in the impedance bridge of the circuit breaker device are closed. These switches can be closed in order to conduct the current into resistive elements and/or capacitive elements in the impedance bridge, as described above.

At 1110, at least one switch is opened in each of the outer bridges of the circuit breaker device. The decision of which switches are to be opened can depend on the direction in which the current is being conducted through the circuit breaker device. These switches are opened while other switches in the outer bridges remain closed in order to prevent conduction of the current through the circuit breaker assembly between the power source and the load, but to allow conduction of the current to the impedance bridge.

At 1112, the current that previously was conducted through the circuit breaker assembly and the circuit breaker device between the power source and the load is dissipated in the impedance bridge. For example, the resistive element and capacitive element in the impedance bridge may form a resonant circuit that conducts the current back and forth between these elements in order to decrease the energy of the current. This resonant circuit may reduce the magnitude of the current relatively quickly.

At 1113, the circuits in the circuit breaker assembly that conduct current to the impedance bridge and/or the arrester device are opened. For example, the remaining switches in the circuit breaker assembly may be opened when the current drops to zero or is close to zero (e.g., within a designated range of zero).

At 1114, once the energy of the current is reduced by a sufficient amount (e.g., the magnitude of the current drops to or below a designated threshold), some or all of the remaining current is conducted into another bridge of the circuit breaker device. This other bridge can include the arrester device described above. The arrester device can absorb or otherwise dissipate the remaining amount of current. By following some or all of the operations of the method 1100, the circuit breaker assembly can quickly stop conduction of current and/or absorb the current being conducted between the power source and the load responsive to a short circuit or other fault.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

As used herein, a structure, limitation, or element that is "configured to" perform a task or operation is particularly structurally formed, constructed, programmed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, programming of the structure or element to perform the corresponding task or operation in a manner that is different from an "off-the-shelf" structure or element that is not programmed to perform the task or operation, and/or denotes structural requirements of any structure, limitation, or element that is described as being "configured to" perform the task or operation.

What is claimed is:

1. A circuit breaker device comprising:
   plural bridges conductively coupled parallel to each other between plural terminals that are configured to be conductively coupled with a power source and a load, the bridges including first and second outer bridges each having plural switches and at least an impedance bridge,
   wherein the switches of the first and second outer bridges are configured to be closed to conduct electric current between the power source and the load and at least one switch in each of the first and second outer bridges are configured to be opened while at least one other switch in each of the first and second outer bridges are configured to remain closed to prevent conduction of the electric current between the power source and the load and to direct the electric current into the impedance bridge.

2. The circuit breaker device of claim 1, wherein the impedance bridge is configured to absorb and reduce the electric current.

3. The circuit breaker device of claim 1, wherein the impedance bridge also includes one or more switches configured to be open during conduction of the electric current between the power source and the load and configured to close during conduction of the electric current into the impedance bridge.

4. The circuit breaker device of claim 1, wherein the impedance bridge includes at least one resistive element and at least one capacitive element conductively coupled in series with each other.

5. The circuit breaker device of claim 1, wherein the resistive element is formed from an internal resistance of the switches.

6. The circuit breaker device of claim 1, wherein the impedance bridge is disposed between the first and second outer bridges.

7. The circuit breaker device of claim 1, wherein the bridges also include an arrester bridge having an arrester device configured to absorb energy of the electric current subsequent to the impedance bridge absorbing at least some of the energy of the electric current.

8. The circuit breaker device of claim 1, wherein at least one of the switches includes a ring-shaped body that extends around a gate opening, the gate opening providing access to a gate terminal of the at least one of the switches.

9. A circuit breaker assembly comprising:
   plural circuit breaker devices conductively coupled in series with each other between opposite terminal ends that are configured to be conductively coupled with a power source and a load between the power source and the load, the circuit breaker devices including plural bridges conductively coupled parallel to each other between the power source and the load, the bridges of each of the circuit breaker devices including first and second outer bridges each having plural switches and at least an impedance bridge,
   wherein the switches of the first and second outer bridges in each of the circuit breaker devices are configured to be closed to conduct electric current through the respective circuit breaker device between the power source and the load, and wherein at least one switch in each of the first and second outer bridges of each of the circuit breaker devices are configured to be opened while at least one other switch in each of the first and second outer bridges of the respective circuit breaker device are configured to remain closed to prevent conduction of the electric current between the power source and the load and to direct the electric current into the impedance bridge of the respective circuit breaker device.

10. The circuit breaker assembly of claim 9, wherein the circuit breaker devices include bodies on which the switches are disposed, and further comprising a conductive interconnect body extending between and including the opposite terminal ends, the interconnect body disposed between neighboring pairs of the circuit breaker devices and conductively coupling the circuit breaker devices in series with each other.

11. The circuit breaker assembly of claim 9, wherein the impedance bridges are configured to absorb and reduce the electric current.

12. The circuit breaker assembly of claim 9, wherein the impedance bridges also include one or more switches configured to be open during conduction of the electric current through the respective circuit breaker device between the power source and the load, and wherein the one or more switches of the impedance bridges are configured to close during conduction of the electric current into the impedance bridge of the respective circuit breaker device.

13. The circuit breaker assembly of claim 9, wherein the impedance bridges include at least one resistive element and at least one capacitive element conductively coupled in series with each other.

14. The circuit breaker assembly of claim 9, wherein the bridges of the circuit breaker devices also include arrester bridges having arrester devices that are configured to absorb energy of the electric current conducted into the respective circuit breaker devices subsequent to the impedance bridge of the respective circuit breaker device absorbing at least some of the energy of the electric current.

15. The circuit breaker assembly of claim 9, wherein the circuit breaker devices are stacked side-by-side such that the switches of the bridges in different ones of the circuit breaker devices are axially aligned with each other along respective axes.

16. The circuit breaker assembly of claim 15, wherein two or more of the switches in the circuit breaker devices include ring-shaped bodies that extends around gate openings that are axially aligned with each other along at least one of the axes, the gate openings providing access to gate terminals of the two or more of the switches.

17. A circuit breaker system comprising:
plural circuit breaker assemblies conductively coupled in parallel to each other between opposite first terminal ends, each of the circuit breaker assemblies including plural circuit breaker devices conductively coupled in series with each other between opposite second terminal ends that are configured to be conductively coupled with a power source and a load between the power source and the load, the circuit breaker devices including plural bridges conductively coupled parallel to each other between the power source and the load, the bridges of each of the circuit breaker devices including first and second outer bridges each having plural switches and at least an impedance bridge,
wherein the switches of the first and second outer bridges in each of the circuit breaker devices are configured to be closed to conduct electric current through the respective circuit breaker device between the power source and the load, and
wherein at least one switch in each of the first and second outer bridges of each of the circuit breaker devices are configured to be opened while at least one other switch in each of the first and second outer bridges of the respective circuit breaker device are configured to remain closed to prevent conduction of the electric current between the power source and the load and to direct the electric current into the impedance bridge of the respective circuit breaker device.

18. The circuit breaker system of claim 17, wherein the circuit breaker devices include bodies on which the switches are disposed, and further comprising plural conductive interconnect bodies extending between and including the opposite second terminal ends, the interconnect bodies disposed between neighboring pairs of the circuit breaker devices in the circuit breaker assemblies and conductively coupling the circuit breaker devices in series with each other in the respective circuit breaker assemblies.

19. The circuit breaker system of claim 17, wherein the circuit breaker devices in each of the circuit breaker assemblies are stacked side-by-side such that the switches of the bridges in different ones of the circuit breaker devices are axially aligned with each other along respective axes.

20. The circuit breaker system of claim 19, wherein two or more of the switches in the circuit breaker devices include ring-shaped bodies that extends around gate openings that are axially aligned with each other along at least one of the axes, the gate openings providing access to gate terminals of the two or more of the switches.

* * * * *